(12) United States Patent
Kolluru et al.

(10) Patent No.: US 6,757,658 B1
(45) Date of Patent: Jun. 29, 2004

(54) AUDIO DECODER CORE (ACORE) MPEG SUB-BAND SYNTHESIS ALGORITHMIC OPTIMIZATION

(75) Inventors: Mahadev S. Kolluru, Santa Clara, CA (US); Satish S. Soman, Cupertino, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/062,346

(22) Filed: Apr. 17, 1998

Related U.S. Application Data

(63) Continuation-in-part of application No. 08/642,520, filed on May 3, 1996, now Pat. No. 5,845,249.

(51) Int. Cl.$^7$ ............................................. G10L 19/00
(52) U.S. Cl. ...................................... 704/500; 704/201
(58) Field of Search .................................. 704/500–504

(56) References Cited

U.S. PATENT DOCUMENTS

| | | | |
|---|---|---|---|
| 5,126,726 A | | 6/1992 | Howard et al. |
| 5,448,310 A | | 9/1995 | Kopet et al. |
| 5,473,631 A | | 12/1995 | Moses |
| 5,515,107 A | | 5/1996 | Chiang et al. |
| 5,576,765 A | | 11/1996 | Cheney et al. |
| 5,576,958 A | | 11/1996 | Kawakatsu et al. |
| 5,594,789 A | | 1/1997 | Seazholtz et al. |
| 5,612,900 A | * | 3/1997 | Azadegan et al. .......... 364/514 |
| 5,623,311 A | | 4/1997 | Phillips et al. |
| 5,635,985 A | | 6/1997 | Boyce et al. |
| 5,638,128 A | | 6/1997 | Hoogenboom et al. |
| 5,712,905 A | * | 1/1998 | Shaw et al. .................... 379/95 |
| 5,801,979 A | * | 9/1998 | Phillips ....................... 364/768 |
| 5,805,482 A | * | 9/1998 | Phillips .................. 374/725.03 |
| 5,813,010 A | * | 9/1998 | Kurano et al. .............. 707/100 |
| 5,838,874 A | * | 11/1998 | Ng et al. ...................... 386/96 |
| 5,867,601 A | * | 2/1999 | Phillips ....................... 382/250 |

OTHER PUBLICATIONS

Tsai et al., "MPEG Audio Chip", IEEE Transactions on Consumer Electronics, vol. 41, Feb., 1995, Nov. 7, 1994.*
Maturi, "Single Chip MPEG Audio Decoder", IEEE Transaction on Consumer ELectronics, vol. 38, #3, Aug. 1992.*
Chwu et al, "A Common Transform Engine for MPEG and AC3 Audio Decoder", Systems and Core Technology, Jun. 3, 1997.*

(List continued on next page.)

*Primary Examiner*—Vijay Chawan
*Assistant Examiner*—Michael N. Opsasnick
(74) *Attorney, Agent, or Firm*—Christopher P. Maiorana PC

(57) ABSTRACT

A digital audio decoder is described. The digital audio decoder includes: (i) an audio core which defines hardware for matrixing and windowing during decoding of MPEG digital audio signals such that matrixing coefficients are multiplied by discrete modified sample values during the matrixing operation; and (ii) an input RAM coupled to the audio core and configured to store the discrete modified sample values calculated outside the audio core in preparation for the matrixing operation and configured to store intermediate values calculated by the audio core during the matrixing operation that are written back to the input RAM. The modified sample values represent either a summation of two samples of MPEG audio data or a difference of the two samples of MPEG audio data.

A process of decoding MPEG digital audio signals in a digital audio decoder including a firmware and a hardware, both of which are configured to decode MPEG audio signals, is also described. The process includes: (i) receiving MPEG encoded digital audio signals; (ii) decoding at least partially the digital audio signals by the firmware using MPEG audio algorithms that precede matrixing and windowing; and (iii) generating modified sample values of MPEG audio data by the firmware for matrixing, the modified sample values represent either a summation of two samples of MPEG audio data or a difference of the two samples of MPEG audio data.

21 Claims, 10 Drawing Sheets

OTHER PUBLICATIONS

Martin Boliek, "*Real–Time Discrete Cosine Transform Chip Using Generalized Chen Transform Technology,*" pp. 428–431, Ricoh California Research Center, Menlo Park, CA.

Unknown, "*Digital Audio Compression (AC–3)*," T3 review copy of draft ATSC audio standard, Aug. 12, 1994, Dec. T3/251.

Unknown, "*Information Technology–Generic Coding of Moving Pictures and Associated Audio Information: Video,*" ISO/IEC 13818–2, Draft International Standard, Nov. 9, 1994.

Unknown, "Coding of Moving Pictures and Associated Audio," ISO/IEC 13818–3, International Standard, Nov. 11, 1994.

"An AC–3/MPEG Multi–standard Audio Decoder IC", By Stephen Li et al., IEEE 1997 Custom Integrated Circuits Conference, pp. 245–248.

Dave Bursky, "*Single Chip Performs Both Audio and Video Decoding,*" Electronic Design, Apr. 3, 1995.

Unknown, "Coding of Moving Pictures and Associated Audio for Digital Storage Media At Up To About 1.5 MBIT/s," 3–11171 rev., (Part 3 Audio), May 30, 1995.

International Organisation for Standardisation Organisation Internationl De normalisation ISO/IEC JTC1/SC29/WG11 Coding of Moving Pictures and Audio, "*Information Technology–Generic Coding of Moving Pictures and Audio: Audio ISO/IEC 13818–3*", Second Addition, Feb. 20, 1997.

Advanced Television Systems Committee, "*Digial Audio Compression Standard (AC–3)*", Dec. 20, 1995.

* cited by examiner

AUDIO DECODER CORE (ACORE) MPEG SUB-BAND SYNTHESIS ALGORITHMIC OPTIMIZATION

CROSS REFERENCE TO RELATED APPLICATIONS

This application is a continuation in part of U.S. patent application Ser. No. 08/642,520 filed on May 3, 1996 now U.S. Pat. No. 5,845,249 and naming Srinivasa R. Malladi and Mahadev S. Kolluru as inventors. That application is incorporated herein by reference for all purposes.

BACKGROUND OF THE INVENTION

The present invention relates to decoding and reconstruction of two channel MPEG-1 and/or multi-channel MPEG-2 audio data. More specifically, the present invention relates to decoding and reconstruction of MPEG-1 and MPEG-2 audio data using an optimized MPEG subband synthesis algorithm.

Various standards have been developed for the purpose of providing digitally encoded audio data that can be reconstructed to provide good quality audio playback. In the late 1980s, a digital audio/video reconstruction standard known as "MPEG" (for Motion Pictures Experts Group) was promulgated by the International Standards Organization (ISO). MPEG syntax provides an efficient way to represent audio and video sequences in the form of compact coded data. MPEG unambiguously defines the form of a compressed bit stream generated for digital audio/video data. Given the knowledge of the MPEG rules, one can thus create a decoder, which reconstructs an audio/video sequence from the compressed bit stream.

MPEG-2 was initiated in the early 1990s to define a syntax for higher quality audio playback for broadcast video. The MPEG-1 audio standard is described in a document entitled "Coding of Moving Pictures and Associated Audio for Digital Storage Media at up to about 1.5 MBit/s" (Part 3 Audio) 3-11171 rev 1 (1995) (hereinafter "the MPEG-1 Document"). The MPEG-2 audio standard is described in a document entitled "Generic Coding of Moving Pictures and Associated Audio Information" ISO/IEC 13818-3 (1994) (hereinafter "the MPEG-2 Document"). Both standards documents are incorporated herein by reference for all purposes. Both documents are available from ISO/IEC Case Postale 56, CH-1211, Geneva 20, Switzerland.

The MPEG-2 audio decoding algorithm requires certain steps such as decoding of bit allocation, decoding of scale factors, variable length decoding of audio samples, requantization of samples and subband synthesis. Subband synthesis further requires the steps of matrixing and windowing.

While CPU digital processing power has improved markedly in recent years, the sheer volume of encoded audio/video data that must be rapidly decompressed and played back generally requires some dedicated system hardware, beyond the CPU, for MPEG-2 decoding. CPUs like SPARC from Sun Microsystems, Inc. of Mountain View, Calif., MIPS from Silicon Graphics, Inc. of Mountain View, Calif., Pentium from Intel Corporation of Santa Clara, Calif., etc. can not, in themselves, handle MPEG-2 audio decoding simultaneously with video decoding running at a low system clock. Thus, software/firmware implementation of the MPEG-2 decoding algorithms is not yet practical for mass market consumer applications, and dedicated hardware must be employed to perform at least some MPEG-2 decoding functions.

Although the ISO/MPEG-2 and AC-3 standards do specify the form that encoded audio data must take, they do not specify either the exact sequence of steps or the hardware that must be employed in decoding the data. Thus, designers of MPEG-2 and AC-3 decoding systems are free to provide their own designs for particular applications. In fact, it is expected that each time an MPEG-2 decoder is to be designed for a new application, a designer will generate a new integrated circuit layout for the decoder.

Thus, it would be desirable to find a way to perform a functional partitioning of the MPEG-1, MPEG-2 and AC-3 audio decoding algorithms such that the partitioning allocates some of the decoding steps to be done in hardware and the remaining tasks to be done in firmware. Furthermore, in the implementation of the firmware/hardware partitioning, it is also desirable to optimize audio decoding algorithms, such as those involved during subband synthesis, to speed up decoding of MPEG audio data and reduce the memory, e.g., input RAM, size on chip.

SUMMARY OF THE INVENTION

The present invention provides a reusable hardware layout ("core") for performing some, but not all, MPEG audio decoding functions. The functional blocks comprising this "audio core" define a unique hardware architecture which can be used with additional hardware or software for performing those MPEG audio decoding functions not performed by the audio core.

Hereinafter, except where distinctions between the two versions of the MPEG standard exist, the terms "MPEG-1" and "MPEG-2" will be used interchangeably to reference those audio decoding algorithms promulgated in the original MPEG Document as well as in the MPEG-2 Document, and any future versions of MPEG decoding.

A chip designer may use the audio core of this invention to expedite the designing of an MPEG video decoder. However, because the audio core of this invention performs only some of the MPEG decoding steps, the designer is free to design blocks optimized for the designer's purposes, to perform the remaining MPEG functions. The audio core of this invention is particularly useful for expeditiously designing "system" chips containing multiple cores on a single chip. Such cores might include, for example, the audio core of this invention, a video core, and a CPU core.

A significant benefit of an audio core derives from its availability for repeated use in many different chips for different applications. In each such chip, the audio decoding functions specified by the audio core can be employed without redesign. Thus, the audio core may be used on a first integrated circuit having a first integrated circuit design and on a second integrated circuit having a second integrated circuit design, with the first and second integrated circuit designs having at least some features not in common. If a system chip is employed, the first integrated circuit design may include a first collection of cores, while the second integrated circuit may include a second collection of cores, etc.—even though the first and second collections of cores have at least one core not in common.

The audio core design itself is preferably stored on a machine readable media such as a magnetic or optical storage unit. The information content of the core preferably includes a series of hardware layouts specifying the locations and features of various circuit elements comprising the audio core architecture. Ultimately, the audio core design is implemented as hardware on one or more chips. Thus, the audio core design exists as both an intangible description of hardware and as the actual hardware itself.

In one embodiment, the audio decoder core design specifies that at least the following MPEG functions are performed by the hardware: sub-band synthesis (or "matrixing") and windowing. These functions are detailed in the MPEG-1 Document. In especially preferred embodiments, other MPEG-2 functions such as bit allocation decoding, scale factor decoding, variable length decoding, requantization, decoupling, rematrixing, and dynamic range compression are not performed by the audio core of this invention.

Preferably, the control logic unit specifies in which function or group of functions of the MPEG decoding process the audio core currently resides. The control logic unit includes an MPEG state machine for generating MPEG current state (also referred to as "curstate"), secondary state (also referred to as "secstate") and loop count (also referred to as "loopcnt"), information. This information is employed by the RAM and ROM addressing logic to specify appropriate addresses for reading and writing data.

In one aspect the present invention provides a digital audio decoder. The decoder includes: (i) an audio core which defines hardware for matrixing and windowing during decoding of MPEG digital audio signals such that matrixing coefficients are multiplied by discrete modified sample values during the matrixing operation; (ii) an input RAM coupled to the audio core and configured to store the discrete modified sample values calculated outside the audio core in preparation for the matrixing operation and configured to store intermediate values calculated by the audio core during the matrixing operation that are written back to the input RAM. The modified sample values represent either a summation of two samples of MPEG audio data or a difference of the two samples of MPEG audio data.

The input RAM may be located outside of the audio core. An input RAM interface may control reading of samples from an input data partition of the input RAM and may control writing intermediate values generated during matrixing to one or more intermediate partitions of the input RAM. The input RAM interface may also control reading intermediate values from the input RAM. The matrixing operation may include calculating $V_i=\Sigma(N_{ik})(S'_k)$, wherein $N_{ik}$ is the matrixing coefficient for i=0 to 63 and k=0 to 31, $S'_k$ is the modified sample value, and for even values of the i of the matrixing coefficient $S'_k=S_k+S_{31-k}$, where k=0 to 30 and for odd values of i of the matrixing coefficient $S'_k=S_k-S_{31-k}$, where k=1 to 31.

In a preferred embodiment, the input RAM of the present invention may include a samples input RAM and an intermediate values input RAM, which is segregated from the samples input RAM. The samples input RAM and the intermediate values input RAM may be located outside of the audio core. An input RAM interface may control reading of samples from the samples input RAM and may control writing intermediate values generated during matrixing to the intermediate values input RAM. The input RAM interface may also control reading intermediate values from the samples input RAM. The intermediate values input RAM may include one or more partitions to store intermediate values for matrixing during decoding MPEG digital audio signals. The samples input RAM and intermediate values input RAM may be coupled to separate addressing logic.

In another aspect, the present invention provides a process of decoding MPEG digital audio signals in a digital audio decoder including a firmware and a hardware, both of which are configured to decode MPEG audio signals. The process includes: (i) receiving MPEG encoded digital audio signals; (ii) decoding at least partially the digital audio signals by the firmware using MPEG audio algorithms that precede matrixing and windowing; and (iii) generating modified sample values of MPEG audio data by the firmware for matrixing, the modified sample values represent either a summation of two samples of MPEG audio data or a difference of the two samples of MPEG audio data.

The step of decoding using MPEG audio algorithms that precede matrixing may include the steps of decoding, bit allocation, decoding of scale factors and requantization. The decoding process may further include computation of the modified sample values, writing modified sample values by the firmware to a samples input RAM. The further decoding process may further still include performing the matrixing, windowing and downmixing on the modified sample values by the hardware. The matrixing operation may include calculating $V_i=\Sigma(N_{ik})(S'_k)$, wherein $N_{ik}$ is the matrixing coefficient for i=0 to 63 and k=0 to 31, $S'_k$ is the modified sample value, and for even values of the i of the matrixing coefficient $S'_k=S_k+S_{31-k}$, where k=0 to 30 and for odd values of i of the matrixing coefficient $S'_k=S_k-S_{31-k}$, where k=1 to 31. $S_k$ represents the original samples which are input to the MPEG sub-band synthesis step.

The firmware may control the operation of a CPU and the hardware may define an audio core. The decoding process may further include: (i) performing downmixing and pulse code modulation by the hardware to produce an output; and (ii) writing the output produced by the hardware to an output RAM. In one embodiment of the present invention, for a period of time the decoding the digital audio signals by the firmware and the performing the windowing and the downmixing by the hardware may be carried out simultaneously.

In the decoding process described above, the step of decoding at least partially the digital audio signals by the firmware may include decoding at least partially audio data for a first channel using MPEG audio algorithms that precede the matrixing to produce values for a first channel that are written to a samples input RAM; and the step of performing the matrixing by the hardware may include performing matrixing on the values for the first channel to compute intermediate values that are written to an intermediate values input RAM. The intermediate values input RAM may be segregated from the samples input RAM. The decoding process may further include signaling the hardware to begin performing matrixing on the values for the first channel, when the firmware concludes writing the values for the first channel to the samples input RAM.

The decoding process may further still include signaling the firmware to begin decoding at least partially audio data for a second channel using MPEG audio algorithms that precede matrixing, when the hardware consumes the modified sample values for the first channel in the input RAM to compute a first set of the intermediate values and completes writing the first set of the intermediate values to the intermediate values input RAM.

The first set of intermediate values may be the intermediate results produced after the hardware completes the matrixing step of decoding MPEG encoded data for the first channel. After decoding is complete, the decoding process may further include: (i) writing by the hardware an output for the first channel to an output RAM after hardware completes decoding the audio data for the first channel and (ii) waiting by the hardware for the firmware to complete writing values for a second channel to the samples input RAM. The number of the modified sample values may be 32. The firmware may compute the modified sample values by using an accumulator that computes a summation of two original samples of MPEG audio data or a difference of the two original samples of MPEG audio data.

In yet another aspect, the present invention provides a process of decoding MPEG digital audio signals. The process includes: (i) receiving modified sample values in a samples input RAM, the modified sample values representing either a summation of two original samples of MPEG audio data or a difference of the two original samples of MPEG audio data; (ii) matrixing the modified samples in an audio core; (iii) writing intermediate values calculated during matrixing to an intermediate values input RAM; and (iv) windowing the intermediate values in the audio core.

The samples input RAM may be segregated from intermediate values input RAM. The step of receiving modified sample values may include receiving modified sample values for a first channel and may further include signaling firmware to begin decoding at least partially audio data for a second channel using MPEG audio algorithms that precede matrixing, when the audio core consumes the modified sample values for the first channel in the input RAM during matrixing to compute a first set of the intermediate results and completes writing the first set of the intermediate results to the intermediate values input RAM.

The first set of intermediate values may be the intermediate values produced after the audio core completes the matrixing step of decoding MPEG encoded data for the first channel. The decoding process, in this embodiment, may further include: (i) writing an output for the first channel to an output RAM after audio core completes decoding the audio data for the first channel; and (ii) waiting for the firmware to complete writing values for a second channel to the samples input RAM. The step of matrixing the modified samples in an audio core may include producing matrixing vector values by multiplying the modified sample values and corresponding matrixing coefficients. The matrixing operation may include calculating $V_i = \Sigma(N_{ik})(S'_k)$, wherein $N_{ik}$ is the matrixing coefficient for i=0 to 63 and k=0 to 31, $S'_k$ is the modified sample value, and for even values of the i of the matrixing coefficient $S'_k = S_k + S_{31-k}$, where k=0 to 30 and for odd values of i of the matrixing coefficient $S'_k = S_k - S_{31-k}$, where k=1 to 31. After matrixing, the decoding process may further include: (i) retrieving appropriate values from intermediate values input RAM; and (ii) multiplying the appropriate values by corresponding windowing coefficients.

In yet another aspect, the present invention provides a digital audio decoder. The digital audio decoder includes: (i) means for decoding digital audio signals, which defines hardware for matrixing during decoding MPEG digital audio signal; and (ii) means for storing coupled to the means for decoding digital audio signals and configured to store discrete number of modified sample values that are calculated outside the means for decoding digital audio signals and loaded on the means for storing in preparation for matrixing and configured to store intermediate values that are calculated by the means for decoding digital audio signals during matrixing that are written back to the means for storing, the modified sample values represent either a summation of two samples of MPEG audio data or a difference of the two samples of MPEG audio data.

DETAILED DESCRIPTION OF THE PREFERRED EMBODIMENTS

A. Application of Invention to Cores

Figure 1:
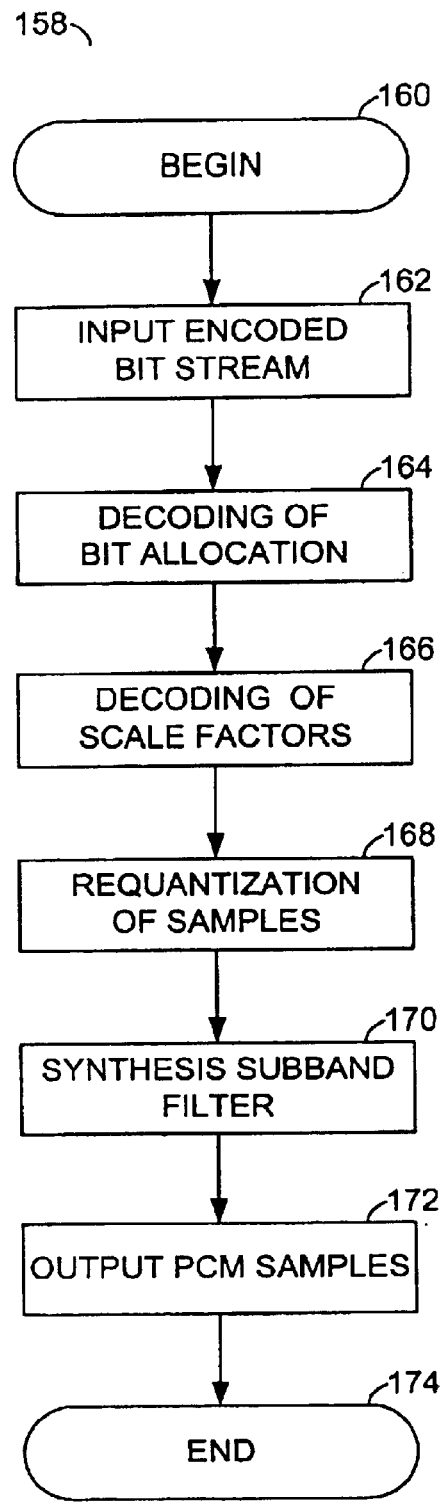
FIG. 1 is a process flow diagram illustrating the major steps required to decode MPEG audio data.

The present invention pertains to integrated circuit cores which implement at least some of the MPEG decoding requirements. As used herein, a "core" is the hardware layout of a substantially self-contained integrated circuit module such as a CPU, an Asynchronous Transfer Mode (ATM) unit, a memory unit, a network interface, a video decoder, and, the subject of this invention, an audio decoder. The physical core has associated therewith a core design which specifies a transistor-level layout including a collection of mask layouts used to generate the reticles for photolithography steps employed during integrated circuit fabrication. The core design also includes certain processing parameters associated with masks, such as ion implant energy and dose, etch conditions, oxidation conditions, chemical vapor deposition conditions, etc. Still further, the core design includes information specifying the core interface parameters such as the types of input and output signals required, the locations of the various interface connections, etc.

Some enterprises maintain libraries of cores, with each core of each library including the design information provided above. Such libraries provide competitive advantages to enterprises that make custom integrated circuits such as multi-core systems on a single semiconductor chip. Often such custom chips are not expected to sell in huge volume (at least as compared to CPU microprocessors for personal computers, for example). Thus, their design costs must be kept to a minimum. This can be accomplished by working with an enterprise that has an appropriate core design available for integration into the customer's chip design because the core need not be designed from scratch; the customer simply sets aside a "black box" of appropriate size and interface reserved for the core within its larger integrated circuit design.

As noted, core design libraries facilitate design of complex multi-functional "systems on a chip" including multiple cores integrated on single semiconductor chip. For instance, a single system on a chip might include a microprocessor core, a video decoder core, and an audio decoder core: all taken from the library of core designs. A system designer is left with the task of integrating the various cores on a single chip and providing any processing functionality not specified in the core designs.

The audio decoder core designs of the present invention possess the benefits of core designs generally as described above. Preferably, though not necessarily, the audio decoder core designs of this invention are provided as part of a larger library of core designs as described above.

While the present invention relates primarily to audio core designs and hardware, it also relates to methods of using the core designs in computer aided design of chip systems. Further, the invention relates to an apparatus for performing these operations. This apparatus may be specially constructed for the required purposes, or it may be a general purpose programmable machine selectively activated or reconfigured by a computer program stored in memory. The designs and methods presented herein are not inherently related to any particular computer or other apparatus. In particular, various general purpose machines may be used with programs written in accordance with the teachings herein, or it may be more convenient to construct a more specialized apparatus to perform the required method steps.

Still further, the present invention relates to machine readable media on which are stored (i) the audio core layout parameters and/or (ii) program instructions for using audio core in performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

B. MPEG-2 Decoding Process

As the present invention preferably implements portions of the MPEG-2 audio decoding algorithms, these general decoding algorithms will now be briefly described with reference to FIG. 1. For purposes of the following discussion, it will be assumed that the reader has available a copy of the above identified MPEG-2 Document, which was previously incorporated herein by reference.

The MPEG decoding process is detailed in FIG. 1. As shown there, a process 158 begins at 160 and then, in a step 162, the MPEG encoded bit stream is input to the audio decoder. Thereafter, at a step 164, the system decodes bit allocation parameters which specify the sample and scalefactor size for the data in each channel. Next, at a step 166, the system decodes "scalefactors" for use in a requantization step. Requantization of the actual encoded audio samples is performed next at a step 168.

MPEG audio data is provided as collections of discrete samples which are decoded in groups of 32. Further, the encoded MPEG audio data may include samples for 1, 2, 3, 4, 5, or 6 distinct channels. If only a single channel is provided, the audio data is replayed in monaural format. If two channels of encoded data are provided, the audio information is replayed in a stereo format. The other channels provide additional audio formats, with the sixth channel providing low frequency enhancement (i.e., the sixth channel provides sub-woofer data). Note that each channel being decoded will be coded in groups of 32 samples. Thus, if the audio format is monaural, only 32 samples will be decoded per MPEG decoding cycle. However, if a stereo format is employed, the decoder will decode 64 samples per decoding cycle.

The examples and discussion presented hereinafter will be directed to the MPEG-1 standard and MPEG-2 Layer I standard in which 32 samples per channel are decoded. However, it should be understood that the invention applies equally to the MPEG-2 Layer II standard in which 32*3=96 samples per channel are decoded.

Returning again to FIG. 1, the process steps conducted through step 168 are performed outside of the audio core of this invention. Beginning with a step 170, processing is performed within the audio core. At step 170, subband synthesis of the samples is performed. Thereafter, at a step 172, the resulting Pulse Code Modulation (PCM) samples are output from the audio core. Thereafter the process is concluded at a step 174.

The process flow 158 is reproduced from 3-A.1 (Annex) A of the MPEG document. It should be noted that MPEG audio decoding can be performed according to two formats in accordance with this invention: layer I and layer II. The above described procedure was made with respect to layer I. Layer II decoding is much like layer I decoding, except that the number of samples being processed in each audio decoding cycle is 96 rather than merely 32. Layers I and II are described generally at pages 39 through 42 of the MPEG document.

Thus, the present invention decodes and reconstructs audio data by performing a functional partitioning of the MPEG-1 and MPEG-2 audio decoding algorithms such that some of the decoding steps are done in hardware and the remaining tasks are done in firmware as described above.

C. Audio Core Microarchitecture—High Level—According to One Embodiment

As mentioned above, some approaches to implementing MPEG audio decoding have relied upon a general purpose CPU and software/firmware for performing all specified decoding steps. Unfortunately, this is not the most efficient way to handle the computationally intensive steps of the MPEG decoding algorithms. Further, to the extent that the CPU must be employed to perform the decoding steps, it is unavailable to perform other processing required by the system. Alternate previous approaches have relied entirely on custom hardware having a microcontroller which microsequences the control functions.

In contrast, the present invention segregates some computationally intensive MPEG decoding functions in dedicated hardware (the audio core), while allowing other less computationally intensive functions to be performed outside the core by a general purpose CPU for example. Thus, an IC designer is at liberty to develop specific processing capabilities for those MPEG decoder functions not in the audio core. Individual customers can employ the audio core of this invention and focus their design efforts on decoder functions such as run length decoding, and thereby develop a market niche on the basis of such specialization. In this invention, the audio core preferably performs the matrixing (inverse discrete cosine transform) and windowing/overlap/add steps only.

Figure 2:
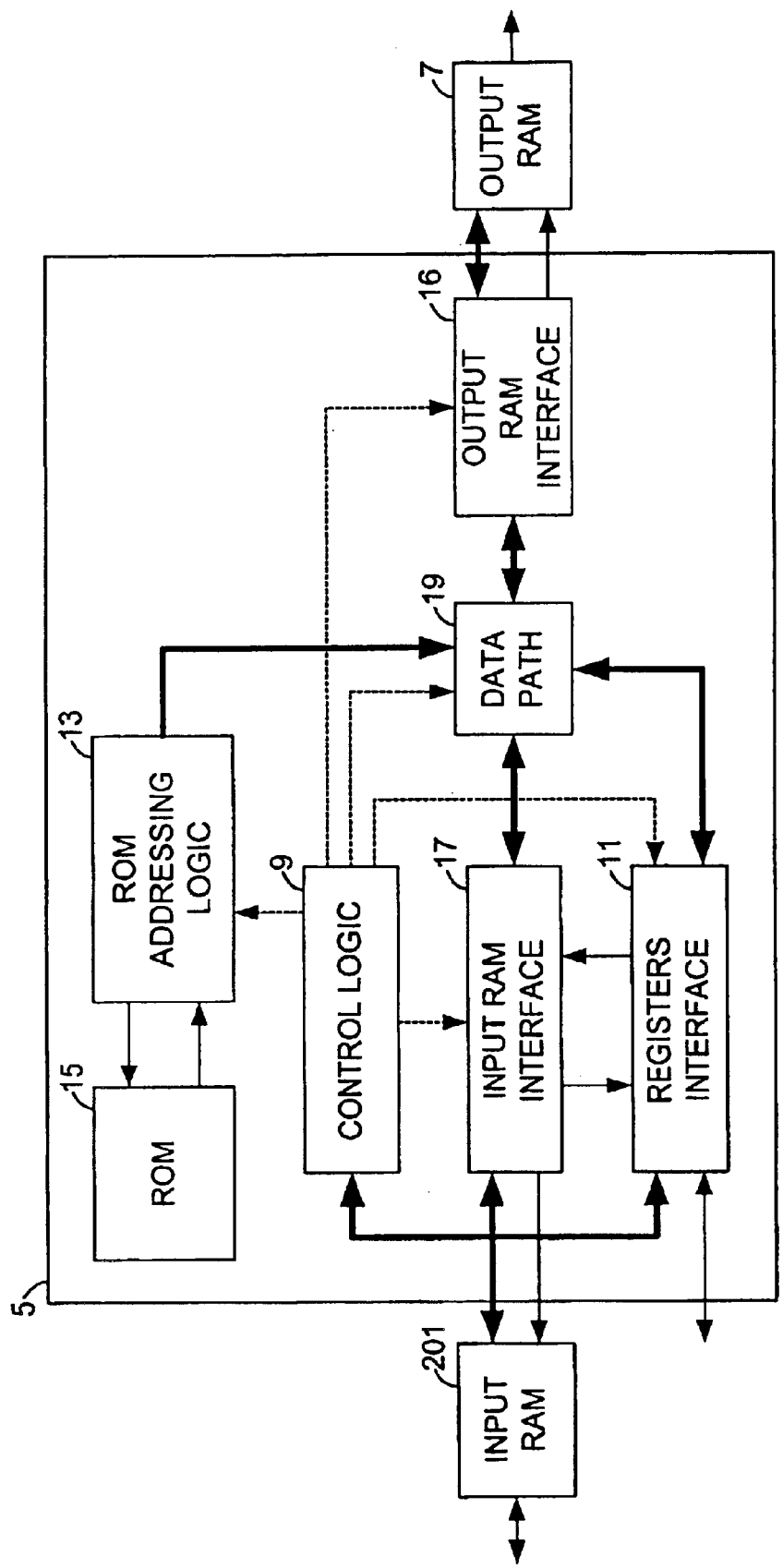
FIG. 2 is a block diagram illustrating the major hardware blocks of a audio core designed in accordance with one embodiment of this invention.

FIG. 2 is a block diagram of an audio core 5 constructed in accordance with a preferred embodiment of the present invention. In this figure, dashed lines indicate control signals, thin continuous lines indicate address signals, and thick continuous lines indicate data signals. While not forming part of the audio core per se, an input RAM 201 and an output RAM 7 are components of the overall audio decoding system which directly communicate with the logical blocks of audio core 5.

The control logic for the audio core 5 resides in a control logic block 9. Control logic block 9 retrieves values from a register interface 11 which, in turn, receives data values from the encoded audio bit stream provided to portions of the audio decoder upstream from the audio core. Based upon the current values in the registers interface 11, the control logic block 9 provides control signals to a ROM addressing logic unit 13, an output RAM interface 16, an input RAM interface 17, and a data path 19. Among the signals provided by control logic block 9 are a "current state" indicative of the state of the overall MPEG process, a "secstate" indicating the operation being performed within the "current state" and a "loopcnt" specifying the number of iterations performed since the system entered its current state.

Sub-band samples that have already been inverse quantized and otherwise processed prior to matrixing to produce, for example, modified sample values (as will be explained later), that are loaded into input RAM 201. When a sufficient number of these samples have been loaded, a signal is provided to the register interface 11 indicating that the audio core may now retrieve the samples stored in input RAM 201. At that point, the samples are provided one-by-one to input RAM interface 17. More specifically, input RAM interface 17 provides address signals to input RAM 201. The samples associated with those address values are then forwarded, in the order specified by the address signals, as data to the input RAM interface 17. From input RAM interface 17, the samples are provided, in the order received, to data path 19. There they are multiplied with appropriate values from a ROM 15 and accumulated as necessary. Note that ROM addressing logic unit 13 generates the addresses for retrieving appropriate stored data values from ROM 15.

Data path 19 performs the computational operations required for sub-band synthesis (matrixing) and windowing in accordance with the MPEG standards. During these processes, intermediate values generated in data path 19 are temporarily written back to input RAM 201. As part of this process, input RAM interface 17 generates appropriate addresses for writing the intermediate values to input RAM 201. In subsequent processing, the intermediate values are retrieved from input RAM 201 by input RAM interface 17 and provided to data path 19 for further processing. After such further processing, the resulting values are forwarded to output RAM 7 where they are stored at addresses generated by output RAM interface 16.

D. Partitioning of the Input RAM in One Embodiment

Figure 3:
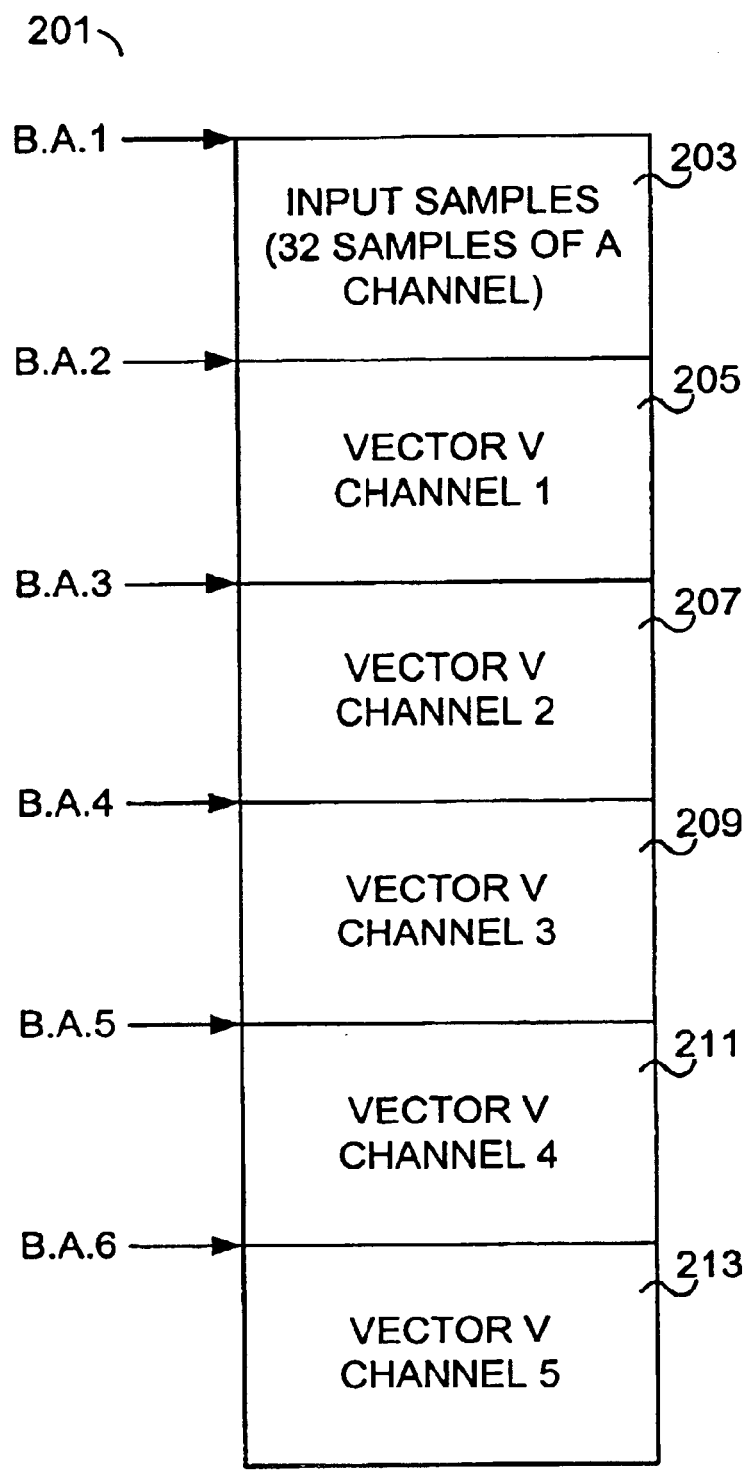
FIG. 3 is a block diagram of an input RAM, according to one embodiment of the present invention, that is used in conjunction with audio core design of FIG. 2.

FIGS. 3 shows the partitioning of the input RAM contents. As shown in FIG. 3, the MPEG partitioning provides seven sections: a first block or section 203 in which input samples from the encoded data or modified samples are stored prior to processing by the audio core and five "vector V" blocks or sections 205, 207, 209, 211 and 213 where intermediate values for a vector V calculated by the audio core for each channel itself are stored. As shown in FIG. 3, input sample section 203 is large enough to store the data contained in 32 samples. Preferably, there are 24 bits per sample. Also shown in FIG. 3, the vector V section 205 is sufficiently large to store 1024 or 512 intermediate values (from vector V) per channel.

E. Audio Core Microarchitecture—Preferred Embodiment

Figure 4:
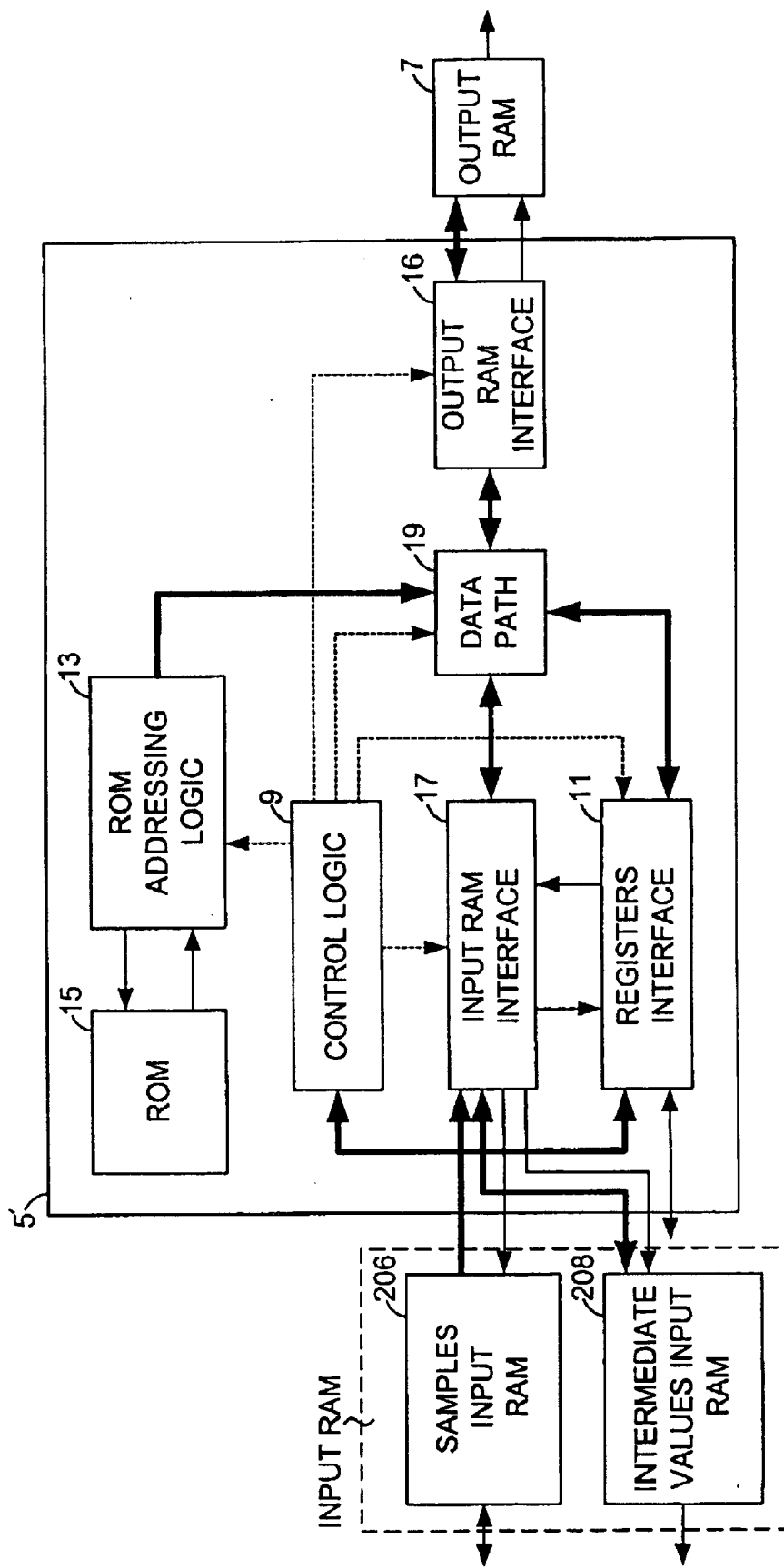
FIG. 4 is a block diagram illustrating the major hardware blocks of a audio core designed in accordance with a preferred embodiment of this invention.

FIGS. 4 is a block diagram of an audio core 5' constructed in accordance with a preferred embodiment of the present invention. Audio core 5' is substantially similar to audio core 5 of FIG. 2, except input RAM 201 of FIG. 2 is segregated into two discrete components in FIG. 4, which components include a samples input RAM 206 and an intermediate values input RAM 208. While not forming part of the audio core per se, samples input RAM 206 and an intermediate values input RAM 208 are components of the overall audio decoding system which directly communicate with the logical blocks of audio core 5'.

After control logic block 9 retrieves values from a register interface 11 which, in turn, receives data values from the encoded audio bit stream provided to portions of the audio decoder upstream from the audio core, control logic block 9 provides a "current state" (curstate) signal indicative of the state of the overall MPEG decoder, a "secondary state" (secstate) indicating the operation being performed within the "current state" and a "loop count" (loopcnt) specifying the number of iterations performed since the system entered its current state.

Sub-band samples that have already been inverse quantized or otherwise processed prior to matrixing (e.g. modified samples) are loaded into samples input RAM 206. When a sufficient number of these samples have been loaded, a signal is provided to the register interface 11 indicating that the audio core may now retrieve the samples stored in samples input RAM 206. At that point, the samples are provided one-by-one to input RAM interface 17. More specifically, input RAM interface 17 provides address signals to samples input RAM 206. The samples associated with those address values are then forwarded, in the order specified by the address signals, as data to the input RAM interface 17. From input RAM interface 17, the samples are provided, in the order received, to data path 19. There they are multiplied with appropriate values from a ROM 15 and accumulated as necessary. Note that ROM addressing logic unit 13 generates the addresses for retrieving appropriate stored data values from ROM 15.

Data path 19 performs the computational operations required for sub-band synthesis (matrixing) and windowing in accordance with the MPEG standards. During these processes, intermediate values generated in data path 19 are temporarily written back to intermediate values input RAM 208. As part of this process, input RAM interface 17 generates appropriate addresses for writing the intermediate values to intermediate values input RAM 208. In subsequent processing, the intermediate values are retrieved from intermediate values input RAM 208 by input RAM interface 17 and provided to data path 19 for further processing. After such further processing, the resulting values are forwarded to output RAM 7 where they are stored at addresses generated by output RAM interface 16.

When the output for a specific channel is complete, control logic block 9 may provide another signal to the register interface 11 indicating that the firmware (CPU) may now retrieve the samples for a subsequent channel.

F. Partitioning of the Input RAM in the Preferred Embodiment

Figure 5:
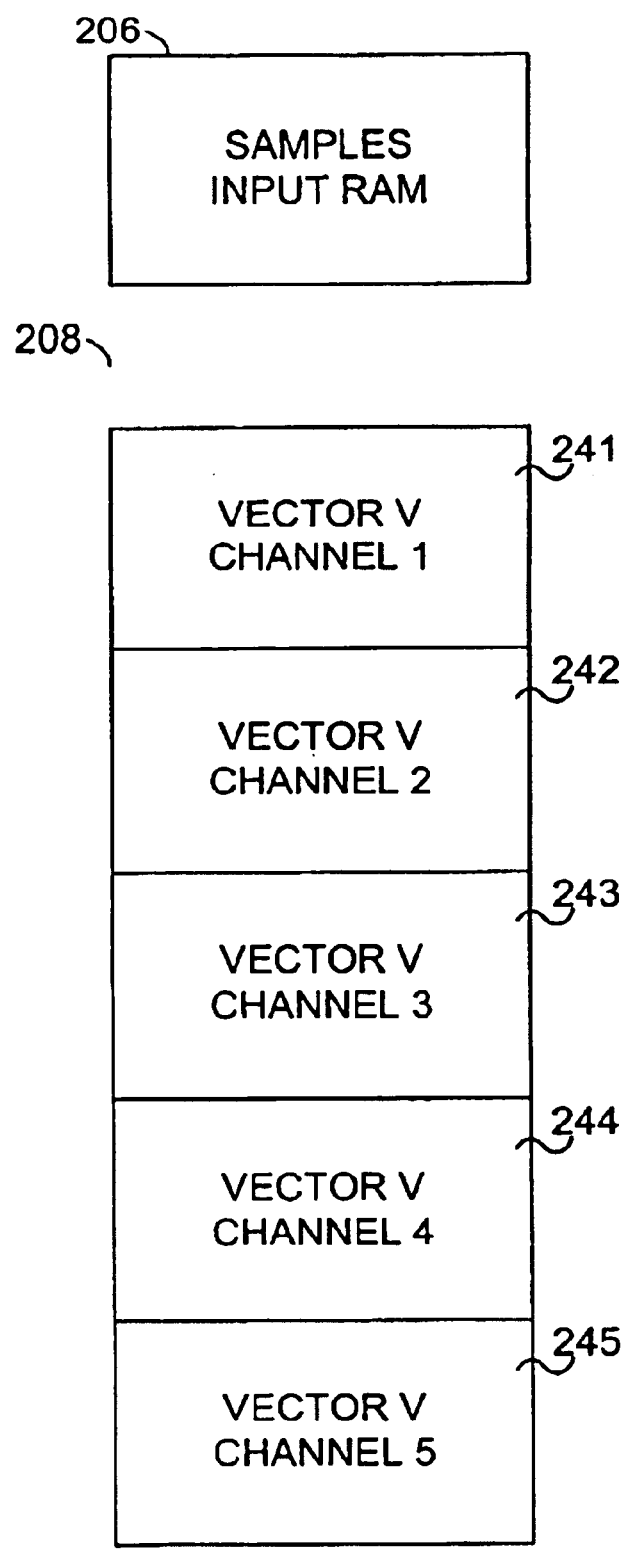
FIG. 5 is a block diagram of an input RAM, according to a preferred embodiment of the present invention, that is used in conjunction with the audio core design of FIG. 2 and is segregated into two distinct blocks of a samples input RAM and an intermediate values input RAM.

FIG. 5 shows the partitioned samples input RAM 206 and intermediate values input RAM 208, according to a more preferred embodiment of the present invention. The incoming encoded data samples or modified sample values before they are presented to the audio core are stored in samples input RAM 206. Samples input RAM 206 may not be partitioned and is generally large enough to store 32 samples of any audio channel. Portions of samples input RAM 206, however, may be unused for MPEG decoding. By way of example, for decoding MPEG audio data 32 samples of any audio channel are stored in a RAM structure that may be capable of holding 256 sample values. The samples input RAM can hold up to 256 values, which is the number of samples processed every iteration, for Dolby AC-3 data.

As shown in FIG. 5, intermediate values input RAM 208 will, however, have five "vector V" sections, one vector V section for each of the five non-PCM channels calculated by the audio core itself are stored, and for this case the intermediate values input RAM is capable of storing 1024*5=5120 values or 512*5=2560 values (in a preferred embodiment). Frequently, however, MPEG decoding involves processing audio data for two channels and in this case intermediate values input RAM 208 may provide two "vector V" blocks 241 and 242 capable of storing 512*2= 1024 values (in a preferred embodiment). Furthermore, blocks 243–245 may remain unused.

G. MPEG Matrixing and Windowing According to the MPEG Documents

Figure 6:
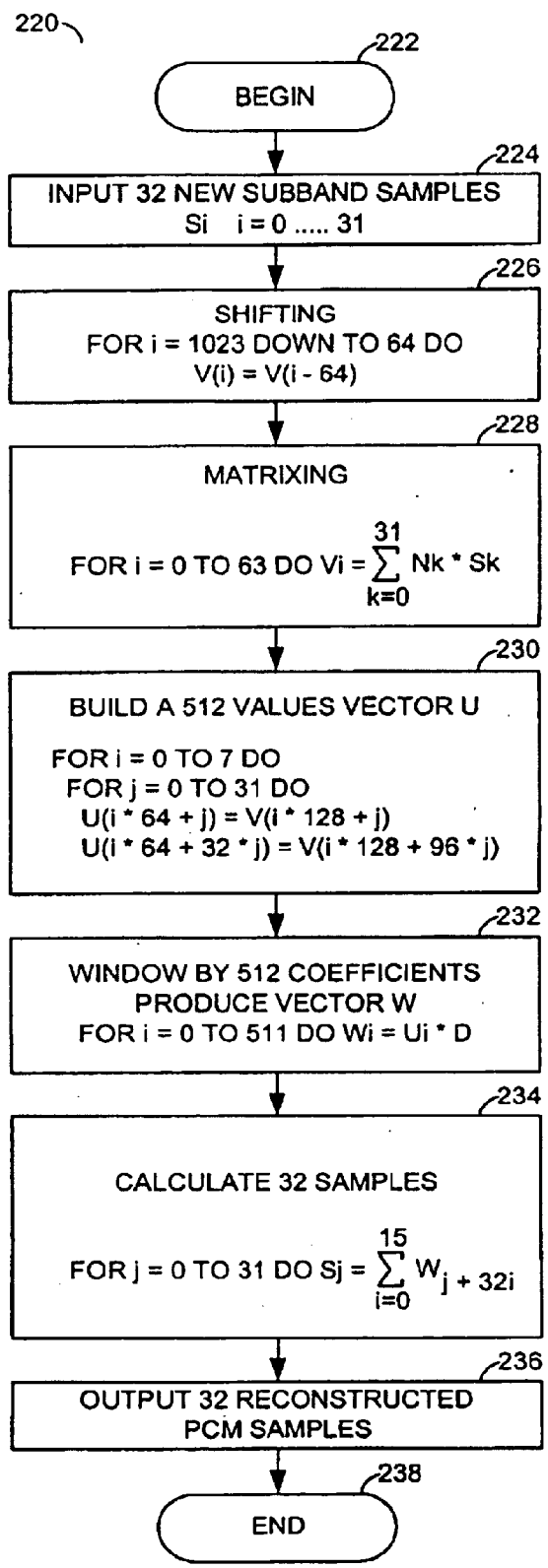
FIG. 6 is a process flow diagram of the principal MPEG Layer I and Layer II matrixing and windowing steps reproduced from the MPEG Document.

FIG. 6 is a flow chart reproduced from the MPEG Documents (MPEG-1 Audio Specification Document ISO/IEC 11171-3 and MPEG-2 Audio Specification Document ISO/IEC 13818-3) and depicts the matrixing and windowing steps as required by the MPEG standard (corresponding to step 170 of FIG. 1). The process begins at 222 and proceeds to a step 224 where 32 new samples (per channel) are input to the decoder. Thereafter, at step 226, the system implementing MPEG "shifts" the indices of elements constituting a vector V. Vector V is made up of 1024 previously stored values. As suggested by the MPEG standard, the shifting process involves freeing up 64 slots ($V_0$–$V_{63}$) by subtracting 64 from the indices of each of the 1024 existing values in vector V. In this manner, the vector values 960 through 1023 are shifted out of vector V.

Next, at a step 228, this system performs a matrixing operation (one dimensional inverse discrete cosine transform or IDCT) in which 64 new values are provided for vector V. These values are given indices $V_0$ through $V_{63}$ and are calculated according to the following expression:

$$V_i = \Sigma N_{ik} * S_k \text{ (for k=0 to 31)}$$

In this expression, the values of $S_k$ are the 32 samples which were input at step 224, and the values of $N_{ik}$ are constants given by the equation $N_{ik}=\cos[(16+i)(2k+1)\pi/64]$. Therefore, each value of V is derived as a summation of 32 terms and each of these 32 terms involves the product of a subband sample with an appropriate matrixing coefficient.

Next, at a step 230, a vector U is created by reindexing the values of vector V according to the expressions shown in 230 of FIG. 6.
for i=0 to 7 do
 for j=0 to 31
  U(64i+j)=V(128i+j)
  U(64i +32j)=V(128i +96j)
Note that vector U will have only half the number of values as vector V (i.e., 512 values versus 1024 values).

The above described set of steps (steps 224, 226, 228, and 230) describe the matrixing operation performed by the audio core. After matrixing has completed at step 230, the windowing process begins at a step 232. As indicated at step 232 in FIG. 6, multiplying each value of vector U by a distinct coefficient, $D_i$, produces a vector W. The values for $D_i$ are provided in Table 3-B.3 (page B-6 though B-8) of Annex B of the (ISO/EC 11171-3) MPEG Document. After the vector W has been created, 32 samples (j=0 to 31) are calculated at a step 234 according to the expression shown in FIG. 6.

$$S_j = \Sigma W_{j+32i} \text{ (for i=0 to 15)}$$

In this expression, the individual sample values are noted by "Sj". As shown, each sample is constructed by summing 16 different values from vector W. Thus, each of the 32 samples employ 16 unique values from vector W, so that each value comprising vector W is used only one time in the construction of the 32 samples. After the samples have been constructed in step 234, a step 236 outputs the reconstructed PCM samples which are ready for playback. The process is completed at 238.

H. MPEG Matrixing and Windowing According to One Embodiment of the Present Invention According to one embodiment, the present invention combines certain of the above mathematical operations required by the MPEG standard and then generates storage addresses for the resulting values according to an indexing scheme that condenses the above-described process to the following steps: (1) an input sub-band sample step, (2) a matrixing step, (3) a windowing step, and (4) an output reconstructed PCM samples step. Thus, in the flow chart of FIG. 6, steps 226, 228, and 230 are combined into a single matrixing step. Similarly, steps 232 and 234 are combined into a single windowing step. In this manner, the sub-band synthesis and windowing step can be performed faster and with fewer resources than is suggested by the MPEG document.

In this embodiment, the audio core begins processing after it is informed that 32 new sub-band samples of an audio channel have been loaded into samples input RAM 206 or block 203 of input RAM 201. At that point, the audio core begins sub-band synthesis of the 32 values of the current audio channel. This entails producing 64 new values for vector V according to the expression shown in step 228 of FIG. 6. The audio core then writes the 64 new values to addresses in the appropriate vector V partition of intermediate values input RAM 208 or input RAM 201 at locations, which overwrite old vector V values $V_{960}$ through $V_{1024}$. In this manner, shifting step 226 (FIG. 6) is effectively performed. Further, the addresses employed by the audio core for storage of the vector V values are accessed as necessary according to the indices specified for the vector U as indicated in step 230 of FIG. 6. Thus, the audio core performs steps 226, 228, and 230 by simply calculating the 64 new values for vector V and then applying an appropriate address to each of these values to carry out windowing as described hereinafter.

The audio core, in this embodiment, performs steps 232 and 234 of FIG. 6 in a single step. This is accomplished by performing the summation shown in step 234 while in the same step generating the values of vector W only as needed for the summation. For example, for j=0 and i=0, the value of vector W is obtained by multiplying the value $U_0$ by the windowing coefficient $D_0$. In this manner, the step of initially calculating all 512 values of vector W is postponed to streamline the data retrieval process.

According to this embodiment, therefore, 16 appropriate values are read from the 1024-valued vector V and multiplied with 16 corresponding windowing coefficients, resulting in 16 product terms. These results are added to yield one reconstructed output PCM sample, as shown in step 236 of FIG. 6. This process is repeated to calculate 32 output PCM sample values, reading appropriate $V_i$ values from the Vector V buffer of 1024 values for every audio channel.

I. MPEG Matrixing and Windowing According to a Preferred Embodiment of the Present Invention The matrixing equation ($V_i = \Sigma N_{ik} * S_k$, for and i=0 to 63) can be expanded as the following expression:

$$V_i = N_{i,0}*S_0 + N_{i,1}*S_1 + \ldots + N_{i,30}*S_{30} + N_{i,31}*S_{31}$$

where $S_0, S_1, \ldots S_{31}$ are a subset of MPEG sub-band samples and $N_{i,0}, N_{i,1}, N_{i,31}$ for i=0 to 63, are the corresponding matrixing coefficients. In a preferred embodiment, the present invention realizes that there exists a symmetry between 32 different $N_{i,k}$ coefficients required for each $V_i$ computation. It is noted that coefficients from $N_{i,0}$ to $N_{i,15}$ are symmetrical to coefficients from $N_{0,31}$ to $N_{i,16}$ and may differ only in sign. In other words, $N_{i,0}$ and $N_{i,31}$ have the same magnitude and may differ only in sign. As a result, the above-mentioned expanded form of matrixing equation can be written as follows:

$$V(i)=N_{i,0}*(S_0 \pm S_{31})+N_{i,1}*(S_1 \pm S_{30})+ \ldots +N_{i,15}*(S_{15} \pm S_{16})$$

In this embodiment, instead of loading actual MPEG audio samples $S_0, S_1, \ldots S_{31}$, samples input RAM 206 is loaded with 32 modified samples, which are $S_0+S_{31}, S_0-S_{31}, S_1+S_{30}, S_1-S_{30}, \ldots S_{15}+S_{16}, S_{15}-S_{16}$, after the CPU concludes performing the accumulate computation. In order to facilitate performing subband synthesis using the modified samples values, the matrixing equation may be rewritten as:

$$V_i = \Sigma N_{ik}*S'_k, \text{ for } k=0 \text{ to } 31, \text{ and } i=0 \text{ to } 63$$

where $S'_k=S_k+S_{31-k}$ for even values of i, where k=0 to 30 and $S'_k=S_k-S_{31-k}$ for odd values of i, where k=1 to 31.

Matrixing, according to the preferred embodiment, involves a step of generating address for samples input RAM 206 or block 203 of input RAM 201 to retrieve a sample S'k and a step of generating ROM address to retrieve a corresponding matrixing coefficient, $N_{ik}$. Next, the audio core may perform the multiplication of the modified sample value and its corresponding matrixing coefficient to produce a product term. Repeating this process 16 times, each time with a different sample and its corresponding matrixing coefficient to produce 16 partial results or product terms, which then undergo an accumulate step to yield a value of vector V. It is important to note that the task of the audio core, during matrixing, in the preferred embodiment, is reduced by 50% because 16 partial sums are calculated and accumulated instead of calculating and accumulating 32 partial sums, as required by the MPEG document. The process described above is repeated 32 times with different modified sample values and corresponding matrixing coefficients, to calculate 64 new values of $V_i$. The results of matrixing operation are then written into intermediate values input RAM 208 or vector V block of input RAM 201. After vector V is updated by dropping oldest 64 $V_i$ values in time and replacing them with the new 64 $V_i$ values, the windowing operation as described below is carried out.

It is explained hereinafter that while there are a total of 1024 values in vector V, according to the MPEG documents, some symmetry in the values of coefficient $N_{ik}$ require storage of only 512 values as vector V in the audio core implementation. That is, half of the values in original vector V are not stored in vector V of the audio core implementation. Thus, the information content in the 1024 values of vector V, as per the MPEG standard, is maintained in the 512 values of vector V of the audio core implementation.

Figure 7:
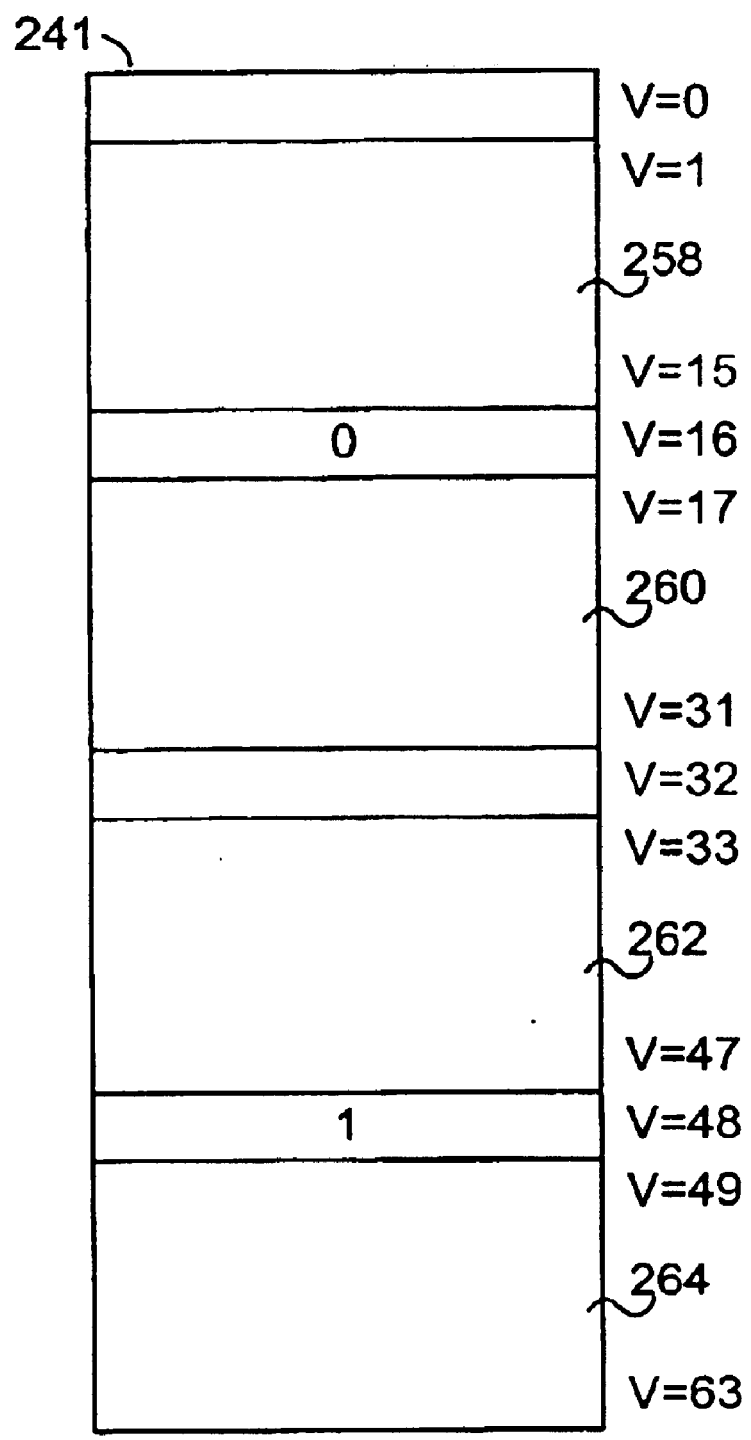
FIG. 7 is a block diagram of the partitioned vector V section in the intermediate values input RAM of FIG. 5.

FIGS. 7 shows vector V section 241 that is part of intermediate values input RAM 208 and divided into four blocks 258, 260, 262 and 264, each block represents a storage area for 16 $V_i$ values. By way of example, the first set of 16 vector $V_i$ values are stored in block 258, the second set are stored in block 260, the third and fourth are stored in blocks 262 and 264, respectively. Those skilled in the art will recognize that a block, e.g., block 205 for channel 1, of input RAM 201 may be similarly partitioned and divided into blocks.

In the preferred embodiment, 32, instead of 64, values of $V_i$ are stored in a block of intermediate values input RAM. Referring to FIG. 7, the present invention realizes that only 32 values of $V_i$ in vector V section 241 are distinct values because the $V_i$ values in block 258 and 260 are symmetrical to each other about $V_{16}$, except with a sign change, and the $V_i$ values in block 262 and 264 are symmetrical to each other about $V_{48}$. In other words, $V_1-V_{15}$ and $V_{31}-V_{17}$ have equal magnitudes, but different signs, and $V_{33}-V_{47}$ and $V_{63}-V_{49}$ have equal magnitudes with the same signs. Furthermore, using the equation $N_{ik}=\cos[(16+i)(2k+1)\pi/64$, provides $V_0=-V_{32}$, $V_{16}=0$ and $V_{48}=1$. As a result, $V_0, V_{16}, V_{32}$ and $V_{48}$ are distinct values. Thus, either the $V_i$ values in block 258 or block 260 are distinct and either the $V_i$ values in block 262 or in block 264 are distinct.

Those skilled in the art will recognize that the non-distinct values can be expressed in terms of or derived from the distinct values. By way of example, if $V_{17}$ is a data required as input for the calculation of a term in windowing operation and $V_{17}=-V_{15}$, then the address generation logic generates the address to access $V_{15}$ from block 258 of the intermediate values input RAM 208 and the sign generation logic generates a "sign=negative" signal. As a result, the actual data required in any computation in the windowing stage may be accessed based on the address and sign generated by the address and the sign generation logic in the audio core. Thus, the RAM address generation logic in the audio core compensates for the reduced size (by 50%) of the vector V size.

In the preferred embodiment, 32 new values of $V_i$ are calculated and these values along with the previous 480 values of $V_i$ that are either zero in the beginning or were calculated over the previous 15 iterations for the same audio channel form the vector V, which is used as an input to windowing. As mentioned before, the actual data required for windowing is accessed by the address generation and sign calculation logic in the audio core. The 512-valued vector V for every audio channel is handled as a cyclic buffer. Before the first set of 32 new values of $V_i$ are calculated, address locations from 0 to 511 in a vector V block for a specific channel are zeros. After the first set of 32 new values of $V_i$ are calculated, however, the 32 new values of $V_i$ are stored in address locations from 479 to 511, replacing the zero values that were stored there in the beginning. In the following iterations, the buffer is filled from the bottom to the top. In other words, the next set of 32 new values of $V_i$ calculated are stored at address locations from 446 to 478 and so on until the buffer is filled up with 16 iterations of each audio channel. In the 17th iteration, however, the 32 new values of $V_i$ calculated are stored in address locations from 479 to 511, overwriting on the oldest 32 $V_i$ values in time.

J. Implementation of the Functionally Partitioned Firmware/Hardware Operating in Sequence In one embodiment, audio core design shown in FIG. 2 is employed for decoding audio data. According to this embodiment, the CPU performs the steps of decoding, bit allocation, decoding of scale factors, requantization and the accumulate step to produce the 32 modified samples. The accumulate step to generate the modified samples values may be performed by an accumulator controlled by the CPU. The CPU then loads the modified sample values into the input RAM 201. The audio core begins processing after it is informed that 32 new sub-band samples or modified samples per channel (24 bits per sample) have been loaded into the input RAM 201. At that point, the audio core begins sub-band synthesis of the 32 values stored for the current audio channel. In this embodiment, the firmware and hardware operate on a set of encoded samples sequentially, i.e. the hardware (audio core) contributes to the decoding process after the firmware has concluded its contribution in the decoding of the 32 samples. Furthermore, in this embodiment, when the hardware takes over the decoding process the firmware is idle and does not contribute to the decoding process until the hardware writes the output to output RAM 7.

K. Implementation of the Functionally Partitioned Firmware/Hardware in an Overlapped Manner In a preferred embodiment, audio core design shown in FIG. 4 is employed for decoding audio data. According to this embodiment, the CPU performs the steps of decoding, bit allocation, decoding of scale factors, requantization, and accumulate step to compute 32 modified sample values. The CPU then computes and loads the 32 modified sub-band samples into the samples input RAM 206. The audio core begins sub-band synthesis after the firmware signals the hardware that 32 new sub-band samples of the current audio channel (24 bits each) have been loaded into samples input RAM 206. The hardware produces 32 new values for vector V according to the expression shown in step 228 of FIG. 6 and writes the 32 new values to vector V section 248 of channel 1 in intermediate values input RAM 208. The present invention recognizes that at this point, the values stored in samples input RAM 206 can be overwritten by new sample values for channel 2. It is important to bear in mind that during the matrixing process by the hardware mentioned above, the firmware is idle. After the hardware concludes writing to vector V section 248 of channel 1 in intermediate values input RAM 208, however, the hardware signals the firmware in this embodiment to proceed to decode the next 32 samples of audio data for channel 2.

In this embodiment, the functions of the firmware and hardware during the decoding process overlap, i.e. the hardware (audio core) and the firmware contribute to decoding simultaneously. Furthermore, the firmware is not idle and begins decoding audio data for a subsequent channel as the hardware continues with the decoding of audio data for the previous channel. Consequently, the preferred embodiment of the present invention is able to perform MPEG-1 two channel/MPEG-2 multi-channel audio decoding, within the available decode time per frame of 24 milliseconds and with a low system clock of about 54 MHz.

The segregation of the input RAM into two distinct blocks, according to the present invention, facilitates in achieving the maximum possible firmware and hardware overlap during implementation. Reference may be made to a patent application entitled "Audio Decoder Core (ACORE) MPEG-1/MPEG-2/AC-3 Functional Algorithm Partitioning And Implementation" Ser. No. 09/062,344, filed on the same day as the instant patent application, and naming the inventors of the instant patent application as inventors) for a detailed discussion on how the firmware and hardware partitioning of the audio decoding tasks and an overlapped firmware and hardware implementation enables the present invention to perform multi-channel audio decoding in the available decode time per audio frame within a low system clock.

L. Partitioning of the Output RAM

After the audio core concludes windowing, the output of each channel is stored in the output RAM 7 at the appropriate section, which may include six sections each sized to store 256 values.

M. Audio Core Microarchitecture—The Input RAM Interface

Preferably, new addresses are generated by input RAM interface 17 from two parameters: a base address and an offset. A first level base address is provided for the beginning of each partition of input RAM 201. As shown in FIG. 3, a base address B.A.1 is provided at the beginning of input samples partition 203 and a base addresses B.A.2, B.A.3, B.A.4, B.A.5, B.A.6 are provided at the beginning of blocks 205, 207, 209, 211 and 213, respectively. For the MPEG vector V blocks in input RAM 201, a unique second level base address is provided for each channel of stored input sub-band samples. To retrieve an input sample in the case of MPEG decoding, the offset need be not greater than 32 (i.e. the maximum number of stored modified sub-band samples of an audio channel). The results of matrixing are written into the intermediate values input RAM partition of 512 values for that channel. Hence, for MPEG matrixing read and write address calculation, a 9 bit offset is used. This reduces the processing resources required for address generation. Specifically, at any given clock cycle, the input RAM interface 17 generates an input RAM address by performing a concatenation of the 3 bit address with a 9 bit offset address.

The proper base address and offset for each stage of the sub-band synthesis and windowing steps performed by the audio core may be uniquely specified as follows. The MPEG process may be divided into a series of "states," e.g., matrixing state, a windowing state, and an output state. Within each state, a defined number of cycles is required to complete the operations required by that state. Further, the secondary state and loop count within each state unambiguously specifies what operation is being performed. Therefore, the audio core state, secondary state and loop count within that state uniquely specify addresses associated with input RAM 201, output RAM 7, and ROM 15. Those addresses are provided as a combination of a base address and an offset as mentioned above.

It should be understood that it requires a few cycles to generate each address. Specifically, various offset values may be multiplexed to generate a single offset value used to calculate the current address. Similarly, multiple base addresses may be multiplexed to generate a single base address used to generate the current address. Further, the offset may be added to/concatenated with the base address. Thus, the current addresses provided by the input RAM interface 17, the output RAM interface 16, and the ROM interface 13 are not generated instantaneously. As a result, the audio core must be designed to begin the address generating process one clock cycle before the address is actually used by the various interfaces. In a preferred implementation of the "current state" in the audio core, each clock cycle may represent more than one operation. For example, during a certain clock cycle, the audio core may be performing the multiplication of "data1" and "data2," while generating the input RAM/ROM addresses for the subsequent data items, e.g., "data3" and "data4." Hence, more than one operation takes place in every clock cycle in a pipelined implementation of MPEG decoding.

Those skilled in the art will recognize that the above described RAM and ROM addressing logic can similarly extend to the preferred embodiment of FIG. 4. By way of example, a first level base address, e.g., B.A.1, may be provided at the beginning of samples input RAM 206 of FIG. 3A and another first level base address, e.g., B.A.2, may be provided at the beginning of each block in intermediate values input RAM 208.

N. Audio Core Microarchitecture1—The Input RAM Interface

Figure 8:
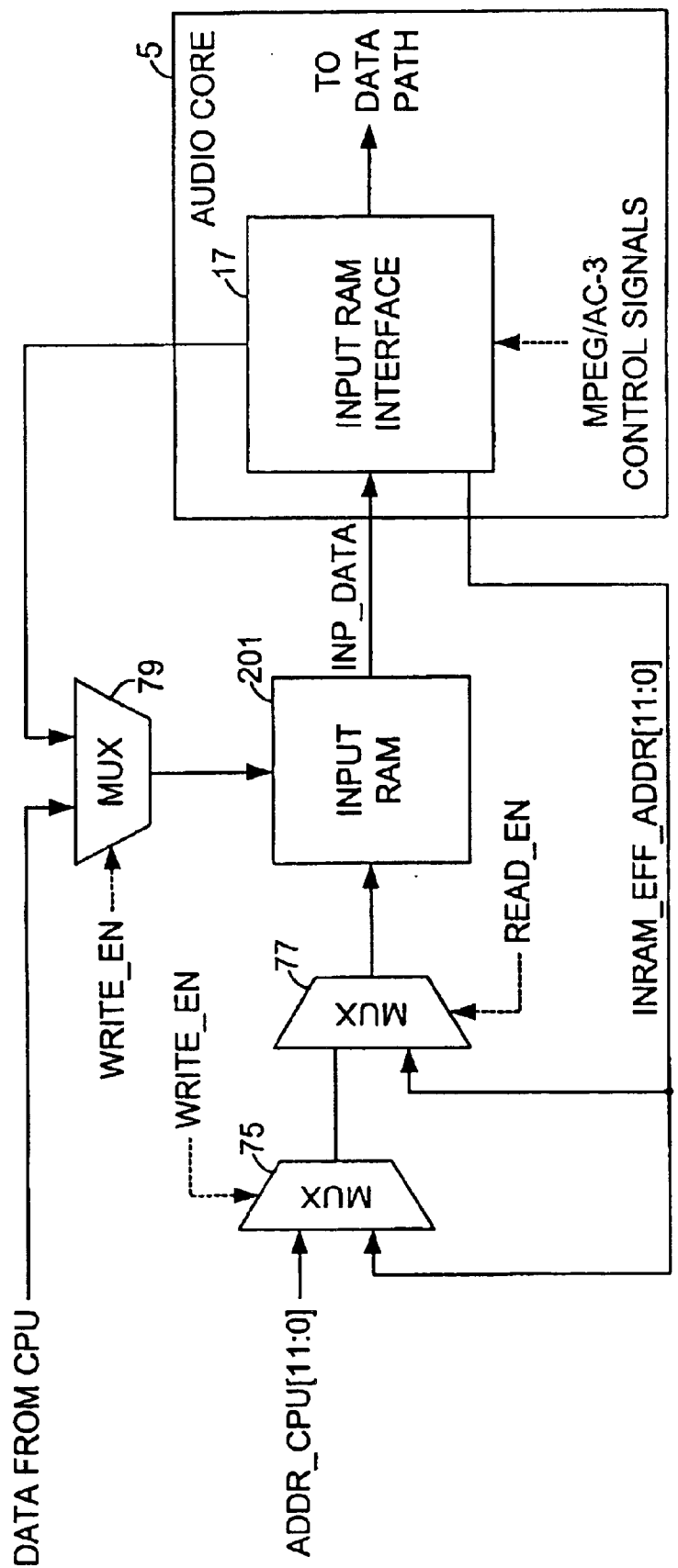
FIG. 8 is a block diagram of the input RAM and relevant address and data hardware within and without the audio core.

FIG. 8 shows how input RAM interface 17 of the audio core 5 communicates with the input RAM 201 and associated control features lying outside of the audio core. These external features may be implemented as hardware or firmware under the control of a system CPU.

When an appropriate MPEG control signal is received by input RAM interface 17 from control logic block 9, input RAM interface 17 will initially perform two functions. It will generate an address to a location within input RAM 201 and it will provide appropriate signals to the firmware outside of the audio core to specify how data and addresses to input RAM 201 are to be arbitrated.

Assuming that data from outside the audio core (e.g., sub-band samples in the incoming bit stream or modified sub-band samples) are to be written to input RAM 201 (partition 203), the audio core will control the process as follows. First, in response to appropriate information from control logic block 9, audio core 5 will provide an active low write enable signal to a multiplexer 75. This directs multiplexer 75 to pass only the addresses generated by a system CPU. Those addresses will then also be passed by a multiplexer 77 so long as the read enable signal from audio core 5 is also deasserted. The CPU generated address is then provided to input ILAM 201 and data is written from a source outside the audio core 5. Specifically, data from an encoded bitstream passed through a multiplexer 79 to input RAM 201 at the address specified (in partition 203).

Now suppose that all 32 sub-band samples or 32 modified sub-band samples for each channel being decoded have been written from the input bit stream to the input samples partition 203 of input RAM 201. At that point, the samples may be serially read in to the audio core 5 by input RAM interface 17. To accomplish this, input RAM interface 17 generates an appropriate address in response to the current MPEG control signal, and, in addition, provides an active read enable signal to multiplexer 77. The effective input RAM address signal generated by input RAM interface 17 is provided to multiplexers 75 and 77. Under these conditions, multiplexer 77 will receive two different addresses one specified by the input RAM interface and the other specified by the logic outside of the audio core. Because the read enable signal is active and the write enable signal is not active, multiplexer 77 will pass the address specified by input RAM interface 17. Thus, that address will be provided to input RAM 201 so that data can be read from it from the desired location.

Assume now that the audio core has performed some intermediate processing to generate intermediate values and these values must be written back to appropriate locations in block 205 of input RAM 201. Again, input RAM interface 17 generates an address based upon the current values of certain control signals provided to it. In addition, the audio core provides an active write enable signal and a not active read enable signal to the multiplexers 75 and 79. Thus, the effective address generated from input RAM interface 17 is passed through multiplexer 75 and thereafter reaches input RAM 201. Further, the data from input RAM interface 17 passes through multiplexer 79 to be written input 201 at the location specified by the current effective address form input RAM interface 17.

Figure 9:
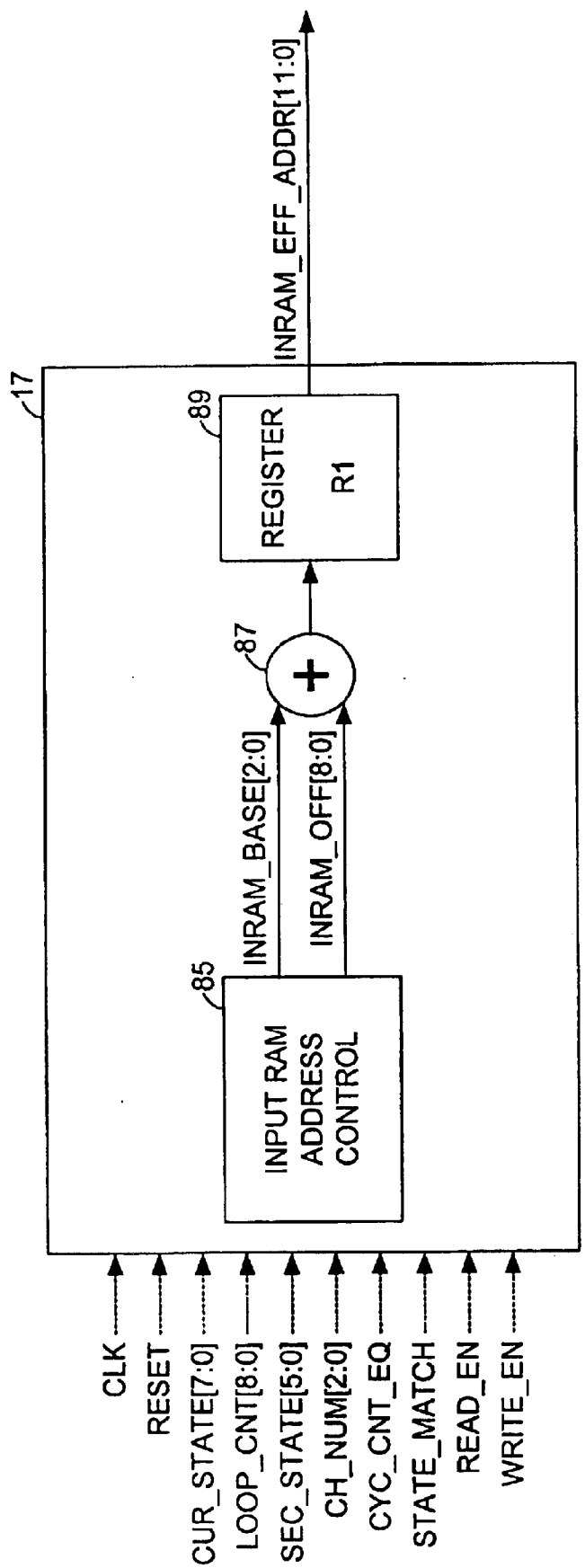
FIG. 9 is a block diagram of an audio core input RAM interface in accordance with one embodiment of the present invention.

FIG. 9 details the architecture of input RAM interface 17. As shown, the signals provided to input RAM interface 17 include clock and reset signals, as well as the current state, secondary state, loop count, channel number, cycle count equal, state match, read enable, and write enable signals. These signals are used by an input RAM address control logic block 85 to generate two values: an input RAM base address and an input RAM offset. The 3 bit channel number input is provided to specify the base address within the input RAM 201. Remember that a separate base address is provided for each channel of data stored in the input RAM 201.

Regarding the calculation of the base address. Control and status registers provide the initial base address for data being written into input RAM 201 or intermediate values input RAM 208. Below these high level base addresses identifying the various partitions of input RAM 201 or intermediate values input RAM 208, there are lower level base addresses separated from one another by constant distances. Each of these lower level base addresses correspond to the first address for a given channel. Thus, input RAM address control 85 can calculate the low level base address from the channel number input signal. An adder 87 adds the value of this low level base to the offset to generate an effective address which is provided to the input RAM 201 or intermediate values input RAM 208.

The effective address is stored in a register 89, which may be read by other components of the audio decoder. Note that the value written into register 89 does not specify whether the corresponding location is to have data written to it or read from it. That depends upon the values 0 or 1 assigned to the read enable bit and the write enable bit.

Preferably, input RAM 201 and samples input RAM 206 are designed to be a one read/write port RAM, which is accessible to the audio core 5 for read operation, and accessible to the firmware for the write operation. Furthermore, preferably, the intermediate values input RAM 208 is also a one read/write port RAM, which is accessible to the audio core 5 for read/write operation, and accessible to the firmware for the read operation.

Figure 10:
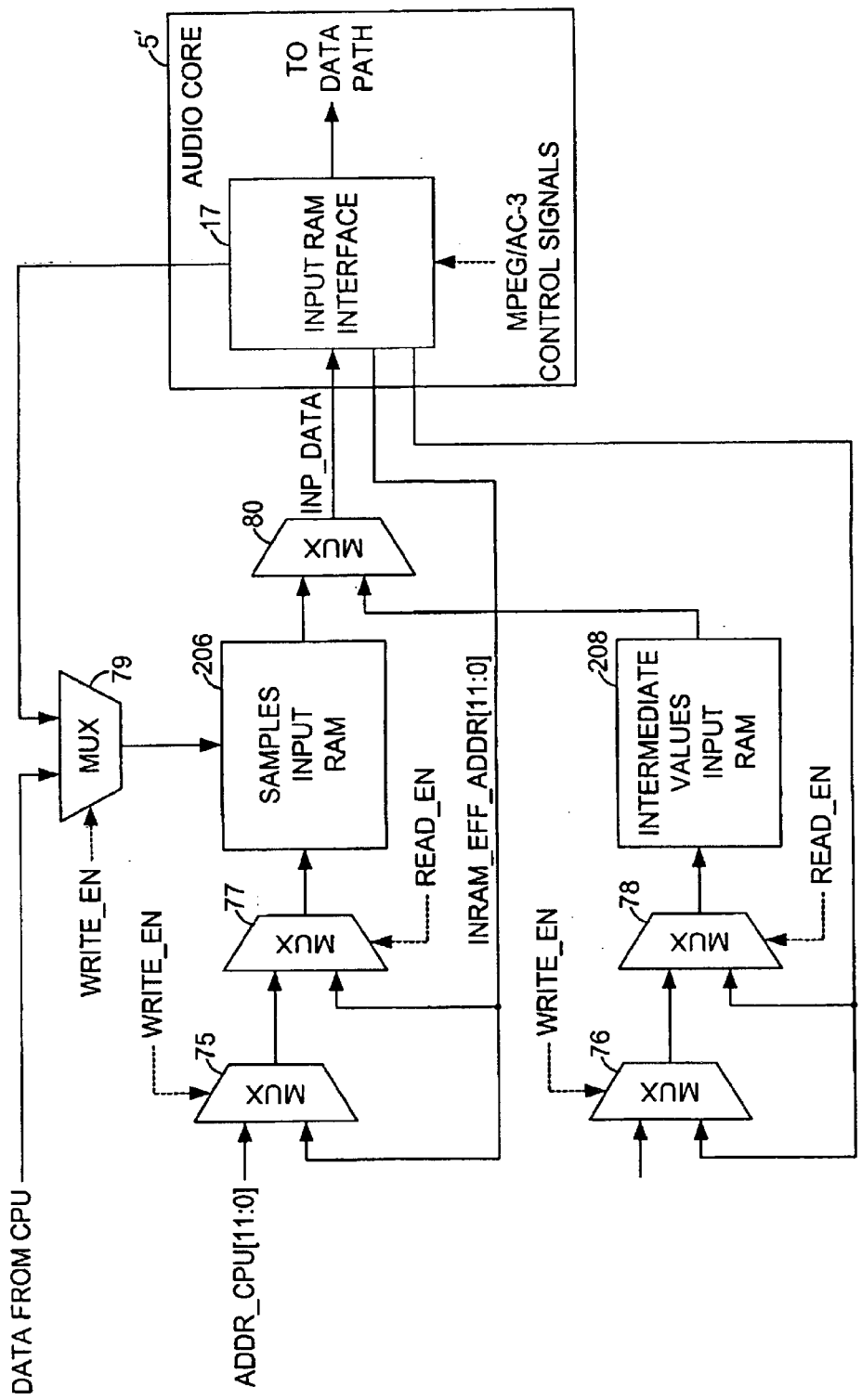
FIG. 10 is a block diagram of the samples and intermediate values input RAM and relevant address and data hardware within and without the audio core.

FIG. 10 shows how input RAM interface 17 of the audio core 5' communicates with the samples input RAM 206, intermediate values input RAM 208 and associated control features lying outside of the audio core 5'. These external features may be implemented as hardware or firmware under the control of a system CPU.

When an appropriate MPEG control signal is received by input RAM interface 17 from control logic block 9, input RAM interface 17 may initially perform two functions. It may generate an address to a location within samples input RAM 206 or intermediate value input RAM 208 and it will provide appropriate signals to the firmware outside of the audio core to specify how data and addresses to samples input RAM 206 are to be arbitrated.

Assuming that data from outside the audio core 5' (e.g., sub-band samples in the incoming bit stream) are to be written to samples input RAM 206, the external CPU will control the process as follows. First, in response to appropriate information from control logic block 9, deasserted read enable and write enable signals are input to a multiplexer 75. This directs multiplexer 75 to pass only the addresses generated by a system CPU. Those addresses will then also be passed by a multiplexer 77 so long as the read enable signal from audio core 5' is also deasserted. The CPU generated address is then provided to samples input RAM 206 and data is written from a source outside the audio core 5. Specifically, data from an encoded bitstream passed through a multiplexer 79 to samples input RAM 206 at the address specified.

Now suppose that all 32 sub-band samples for each channel being decoded have been written from the input bit stream to the samples input RAM 206. At that point, the samples may be serially read in to the audio core 5' by input RAM interface 17. To accomplish this, input RAM interface 17 generates an appropriate address in response to the current MPEG-2 or AC-3 control signals, and, in addition, provides an active read enable signal to multiplexer 77. The effective input RAM address signal generated by input RAM interface 17 is provided to multiplexers 75 and 77. Under these conditions, multiplexer 77 will receive two different addresses one specified by the input RAM interface 17 and the other specified by the logic of the audio core 5'. Because the read enable signal is active and the write enable signal is not active, multiplexer 77 will pass the address specified by input RAM interface 17. Thus, that address will be provided to samples input RAM 206 so that data can be read from it from the desired location.

Assume now that the audio core 5' has performed some intermediate processing to generate intermediate values and these values must be written back to appropriate locations in intermediate values input RAM 208. Again, input RAM interface 17 generates an address based upon the current values of certain control signals provided to it. In addition, the audio core 5' provides an active write enable signal and a not active read enable signal to multiplexers 76 and 78. Thus, the effective address generated from input RAM interface 17 is passed through multiplexer 76 and thereafter reaches intermediate values input RAM 208. Further, the data from input RAM interface 17 passes through multiplexer 79 to be written to intermediate values input RAM 208 at the location specified by the current effective address from input RAM interface 17.

O. Conclusion

Although the foregoing invention has been described in some detail for purposes of clarity of understanding, it will be apparent that certain changes and modifications may be practiced within the scope of the appended claims. For example, while the present invention employs the optimized sub-band synthesis algorithm in a firmware/hardware partitioned design, there is no reason why in principle the optimized sub-band synthesis algorithm of the present invention cannot be used in a purely software or a purely hardware implemented audio decoder design. Therefore, the present embodiments are to be considered as illustrative and not restrictive, and the invention is not to be limited to the details given herein, but may be modified within the scope of the appended claims.

What is claimed is:

1. A digital audio decoder comprising:

a general purpose processor programmable to calculate discrete modified sample values of digital audio signals;

a dedicated hardware module (i) comprising an interface block and (ii) configured to perform matrixing computations on said discrete modified sample values; and an input RAM coupled to said general purpose processor and said interface block and configured to store said discrete modified sample values calculated by said general purpose processor in preparation for said matrixing computations, wherein said interface block is configured to (i) write intermediate values generated during said matrixing computations to said input RAM and (ii) read said intermediate values from said input RAM, and wherein for a period of time said calculation and said matrixing computations are carried out simultaneously.

2. The digital audio decoder of claim 1, wherein the input RAM is located outside of said dedicated hardware module.

3. The digital audio decoder of claim 1, wherein said interface block is further configured to read said discrete modified sample values from said input RAM.

4. The digital audio decoder of claim 3, wherein said matrixing computations include calculating $V_i = \Sigma(N_{ik})(S'_k)$, wherein $N_{ik}$ is said matrixing coefficient for i=0 to 31 and k=0 to 31, $S'_k$ is said discrete modified sample value, and for even values of said i, $S'_k = S_k + S_{31-k}$, where k=0 to 30 and for odd values of said i, $S'_k = S_k - S_{31-k}$, where k=1 to 31.

5. The digital audio decoder of claim 1, wherein said input RAM comprises a samples input RAM configured to store said discrete modified samples and an intermediate values input RAM configured to store said intermediate values segregated from said samples input RAM.

6. The digital audio decoder of claim 5, wherein said intermediate values input RAM includes one or more partitions to store intermediate values generated by said matrixing computations during decoding of said digital audio signals.

7. The digital audio decoder of claim 1, wherein each of said discrete modified sample values represent either a summation of two samples of said digital audio signals or a difference of said two samples of said digital audio signals.

8. The digital audio decoder of claim 1, wherein said reading and said writing of said intermediate values by said interface block are carried out simultaneously with said calculation of said discrete modified sample values by said dedicated hardware module and said matrixing computations on said discrete modified samples by said dedicated hardware module during said period of time.

9. A process of decoding MPEG digital audio signals in a digital audio decoder including a general purpose processor, an input RAM, and a dedicated hardware module that are configured to decode said digital audio signals, the process comprising:

(A) receiving said digital audio signals at said general purpose processor;

(B) partially decoding said digital audio signals by said general purpose processor using audio computations that precede matrixing computations in response to step (A) to present discrete modified sample values of said digital audio signals;

(C) storing said discrete modified sample values in said input RAM in response to step (B);

(D) reading said discrete modified sample values from said input RAM to said dedicated hardware module in response to step (C);

(E) performing matrixing computations on said modified sample values by said dedicated hardware module in response to step (D); and (F) performing windowing computations on said discrete modified sample values by said dedicated hardware module in response to step (E), wherein for a period of time (i) said partially decoding of said digital audio signals by said general purpose processor and (ii) said performing windowing computations and said performing downmixing computations by said dedicated hardware module are carried out simultaneously.

10. The process of claim 9, wherein step (B) comprises the sub-steps of:

decoding;

allocating bits;

decoding scale factors; and requantizationing.

11. The process of claim 9, further comprising the step of:

performing downmixing computations on said discrete modified sample values by said dedicated hardware module in response to said performing windowing computations.

12. The process of claim 11, further comprising the steps of:

pulse code modulating said discrete modified sample values by said dedicated hardware module in response to said performing downmixing computations to produce an output signal; and writing said output signal to an output RAM.

13. The process of claim 11, wherein:

said partially decoding said digital audio signals by said general purpose processor includes partially decoding a first channel of said digital audio signals using said audio computations that precede said matrixing computations to produce first discrete modified sample values that are written to said input RAM; and said performing matrixing computations by said dedicated hardware module includes performing matrixing computations on said first discrete modified sample values to produce first intermediate values that are written to said input RAM.

14. The process of claim 13, further comprising the step of signaling said dedicated hardware module to begin said performing matrixing computations on said first discrete modified sample values when said general purpose processor concludes writing said first discrete modified sample values to said input RAM.

15. The process of claim 14, further comprising the step of signaling said general purpose processor to begin partially decoding a second channel of said MPEG digital audio signals using said audio computations that precede matrixing computations when said dedicated hardware module completes writing said first intermediate values to said input RAM.

16. The process of claim 9, wherein each of said discrete modified sample values represent either a summation of two samples of said digital audio signals or a difference of said two samples of said digital audio signals.

17. A digital audio decoder comprising:

programmable means for calculating discrete modified sample values of digital audio signals;

first non-programmable means for performing matrixing computations on said discrete modified sample values;

means for storing coupled to said programmable means and said first non-programmable means and configured to store said discrete modified sample values calculated by said programmable means in preparation for said matrixing computations; and second non-programmable means for (i) writing intermediate values generated during said matrixing computations to said means for storing and (ii) reading said intermediate values from said means for storing, wherein for a period of time said calculation and said matrixing computations are carried out simultaneously.

18. The digital audio decoder of claim 17, wherein each of said discrete modified sample values represent either a summation of two samples of said digital audio signals or a difference of said two samples of said digital audio signals.

19. The digital audio decoder of claim 17, wherein said reading and said writing of said intermediate values by said second non-programmable means are carried out simultaneously with said calculation of said discrete modified sample values by said programmable means and said matrixing computations on said discrete modified sample values by said first non-programmable means during said period of time.

20. A machine readable medium for use in a computer to layout a digital audio decoder, the machine readable medium recording a computer program that is readable and executable by the computer, the computer program comprising:

specifying a general purpose processor programmable to calculate discrete modified sample values of digital audio signals;

specifying a dedicated hardware module configured to perform matrixing computations on said discrete modified samples and comprising an interface block; and specifying an input RAM coupled to said general purpose processor and said interface block and configured to store said discrete modified sample values calculated by said general purpose processor in preparation for said matrixing computations, wherein said interface block is configured to (i) write intermediate values generated during said matrixing computations to said input RAM and (ii) read said intermediate values from said input RAM, and wherein for a period of time said calculation and said matrixing computations are carried out simultaneously.

21. The machine readable medium of claim 20, wherein said reading and said writing of said intermediate values by said interface block are carried out simultaneously with said calculation of said discrete modified sample values by said general purpose processor and said matrixing computations on said discrete modified samples by said dedicated hardware module during said period of time.

* * * * *